US012097536B2

(12) United States Patent
LeCompte et al.

(10) Patent No.: US 12,097,536 B2
(45) Date of Patent: Sep. 24, 2024

(54) PLANAR MOP CONFIGURATION WITH ADJUSTABLE SPACING

(71) Applicant: MICRONOVA MANUFACTURING, INC., Torrance, CA (US)

(72) Inventors: Phillip LeCompte, Anaheim, CA (US); Robert Emmons, West Bridgewater, MA (US)

(73) Assignee: Micronova Manufacturing, Inc., Torrance, CA (US)

( * ) Notice: Subject to any disclaimer, the term of this patent is extended or adjusted under 35 U.S.C. 154(b) by 1117 days.

(21) Appl. No.: 16/500,403

(22) PCT Filed: Apr. 3, 2018

(86) PCT No.: PCT/US2018/025834
§ 371 (c)(1),
(2) Date: Oct. 3, 2019

(87) PCT Pub. No.: WO2018/187290
PCT Pub. Date: Oct. 11, 2018

(65) Prior Publication Data

US 2021/0101184 A1 Apr. 8, 2021

Related U.S. Application Data

(60) Provisional application No. 62/481,083, filed on Apr. 3, 2017.

(51) Int. Cl.

| | |
|---|---|
| ***B08B 1/30*** | (2024.01) |
| ***B08B 1/10*** | (2024.01) |
| ***B08B 13/00*** | (2006.01) |

(52) U.S. Cl.
CPC .................. *B08B 1/30* (2024.01); *B08B 1/10* (2024.01); *B08B 13/00* (2013.01)

(58) Field of Classification Search
None
See application file for complete search history.

(56) References Cited

U.S. PATENT DOCUMENTS

| | | | | |
|---|---|---|---|---|
| 570,339 | A * | 10/1896 | Roberts | E01H 8/10 15/54 |
| 635,778 | A | 10/1899 | Hudelson | |
| 1,181,428 | A * | 5/1916 | Browning | A47L 23/18 15/267 |
| 3,481,727 | A | 12/1969 | Dickinson et al. | |
| 3,840,933 | A | 10/1974 | Schwab et al. | |
| 5,096,262 | A | 3/1992 | Foullois | |
| 5,372,546 | A | 12/1994 | Brakke | |

(Continued)

OTHER PUBLICATIONS

Wisniewski, Dominique, International Search Report, Jun. 28, 2018, 5 pages, Australian Patent Office, Woden ACT, Australia.

(Continued)

*Primary Examiner* — Eric W Golightly
*Assistant Examiner* — Arlyn I Rivera-Cordero
(74) *Attorney, Agent, or Firm* — James A. Henricks; Scott R. Hansen

(57) ABSTRACT

A biplanar cleaning tool includes adjustable spacers having nested, telescoping or concentric bosses providing for adjustability of the spacing between planar elements of the biplanar cleaning tool.

18 Claims, 5 Drawing Sheets

(56) References Cited

U.S. PATENT DOCUMENTS

| | | | | |
|---|---|---|---|---|
| 2001/0054538 | A1* | 12/2001 | Finger .................... | B65G 45/16<br>198/499 |
| 2005/0087318 | A1 | 4/2005 | Corriveau | |
| 2016/0082482 | A1 | 3/2016 | LeCompte et al. | |

OTHER PUBLICATIONS

Wisniewski, Dominique, Written Opinion of the International Search Authority, Jun. 28, 2018, 5 pages, Australian Patent Office, Woden ACT, Australia.

Van Der Zee, Willem, Extended European Search Report, Dec. 4, 2020, 9 pages, European Patent Office, The Hague, Munich, Germany.

* cited by examiner

PLANAR MOP CONFIGURATION WITH ADJUSTABLE SPACING

CROSS REFERENCE TO RELATED APPLICATIONS

This application is a National Stage of International Application No. PCT/US2018/025834, filed Apr. 3, 2018, which claims priority to U.S. 62/481,083 filed Apr. 3, 2017, the entire contents of which are incorporated herein by reference.

BACKGROUND

Field

These inventions relate to bi-planar cleaning tools, for example bi-planar cleaning tools used in lyophilizers and other shelf-type equipment.

SUMMARY

A biplane cleaning tool, such as one that may be used for cleaning adjacent shelves in lyophilizers, may have the spacing between planar elements adjustable, for example by way of one or more adjustable spacer assemblies positioned between the planar elements. In one example, a cleaning tool having first and second planar members or elements are maintained in a spaced apart relationship by at least one spacer element, which in the present example is an assembly of structures, two of which are selectively movable with respect to each other for adjusting a spacing between the planar elements. A first structure has a first structure surface and a second structure has a second structure surface facing the first structure surface, and the first and second structures are selectively movable or controllably movable with respect to each other to adjust the spacing between the planar elements. The first and second structures are slidable or movable relative to each other, such as with the first and second structure surfaces sliding along each other, for changing the spacing between the planar elements. Relative movement between the first and second structures may be controlled by a releasable locking element, a fastener, a gear arrangement or other controllable structure.

In any of the spacer elements described herein, the first and second structures movable relative to each other for adjusting the spacing between the planar elements may take a number of configurations. In one configuration, the first and second structures may be adjacent blocks having facing surfaces and controllably or releasably positionable with respect to each other. For example, they can be dovetailed together or otherwise engaged with each other so that movement of the first and second structures relative to each other changes the spacing between the planar elements. In another configuration, the first and second structures are nested columns selectively or controllably movable with respect to each other, and in a further configuration, the first and second structures are concentric cylinders selectively or controllably movable relative to each other to change the spacing between the planar elements. In another configuration, the first and second structures are selectively or controllably telescoping relative to each other for changing the spacing between the planar elements.

In any of the examples described herein of first and second structures that are concentric cylinders, for adjustable spacer elements or assemblies, at least one of the cylinders can be a circular cylinder, for example a right circular cylinder, supported closer to a first planar element, and the other of the first and second cylinders positioned farther from the first planar element than the first cylinder may be positioned either inside or outside the first cylinder. In one example, the first cylinder closer to the first planar element has a smaller cross-sectional area than the second cylinder, and in another example the first cylinder closer to the first planar element has a larger cross-sectional area than the second cylinder.

In one example of first and second structures movable relative to each other, the first structure may be closer to the first planar element and may be a hollow cylinder and the second structure may be a cylinder fitting in the hollow of the first cylinder. In another example of the first and second structures movable relative to each other, the first structure may be a cylinder closer to the first planar element and the second structure may be a hollow cylinder fitting over the first cylinder. In each of the foregoing two examples, the second cylinder may include a hollow portion for receiving a spring or other biasing element, for example for biasing the first and second planar members apart.

In any of the examples described herein of adjustable spacer elements or assemblies, the spacer assembly may also include a spring or other biasing element configured for increasing the length of the spacer element, for example to bias the first and second planar members apart. The spring or biasing element may be a coil spring or compression spring, for example.

In any of the examples described herein of adjustable spacer elements or assemblies, the spacer elements or assemblies may be selectively or controllably adjustable by a locking element, fastener, a gear element, latch element or the like.

Any of the spacer elements or assemblies described herein can be used with a biplane cleaning tool, for example having first and second planar members spaced apart from each other and having respective first and second oppositely-facing surfaces for receiving respective cleaning components, for example mop material or other cleaning elements. The cleaning tool may include a control adapter supported on one or the other of the planar members for receiving a control element, for example a handle or other manual control element.

In one example of a biplane cleaning tool having at least one spacer element or assembly as described herein, the cleaning tool includes first and second planar members wherein at least one of the planar members supports a handle adapter for supporting a handle. At least one spacer assembly extends between the first and second planar members and includes a first boss supported on the first planar member and a second boss nested with the first boss wherein the first and second bosses are selectively or controllably movable relative to each other, and can be fixed in a selected position relative to each other. Optionally, a third boss may be supported by the second planar member, and a spring or other bias element may extend between the second and third bosses to bias apart the first and second planar members, or if a third boss is omitted, the spring or other bias element may extend between the second boss and the second planar member to bias apart the first and second planar members. In one configuration, the second boss extends into an opening in the first boss, and in another configuration, the second boss extends over a portion of the first boss. A controllable fastener, locking element, latch or other securement can selectively secure the first and second bosses relative to each other.

These and other examples are set forth more fully below in conjunction with drawings, a brief description of which follows.

DETAILED DESCRIPTION

This specification taken in conjunction with the drawings sets forth examples of apparatus and methods incorporating one or more aspects of the present inventions in such a manner that any person skilled in the art can make and use the inventions. The examples provide the best modes contemplated for carrying out the inventions, although it should be understood that various modifications can be accomplished within the parameters of the present inventions.

Examples of tools and of methods of making and using the tools are described. Depending on what feature or features are incorporated in a given structure or a given method, benefits can be achieved in the structure or the method. For example, lyophilizer cleaners with adjustable plate spacing allow more flexibility in cleaning lyophilizers, and more efficient cleaning of lyophilizers. Additionally, nested or concentric plate support structures can be used to provide adjustability in the assembly while still providing a reliable support configuration.

These and other benefits will become more apparent with consideration of the description of the examples herein. However, it should be understood that not all of the benefits or features discussed with respect to a particular example must be incorporated into a tool, component or method in order to achieve one or more benefits contemplated by these examples. Additionally, it should be understood that features of the examples can be incorporated into a tool, component or method to achieve some measure of a given benefit even though the benefit may not be optimal compared to other possible configurations. For example, one or more benefits may not be optimized for a given configuration in order to achieve cost reductions, efficiencies or for other reasons known to the person settling on a particular product configuration or method.

Examples of a number of tool configurations and of methods of making and using the tools are described herein, and some have particular benefits in being used together. However, even though these apparatus and methods are considered together at this point, there is no requirement that they be combined, used together, or that one component or method be used with any other component or method, or combination. Additionally, it will be understood that a given component or method could be combined with other structures or methods not expressly discussed herein while still achieving desirable results.

As used herein, "substantially" shall mean the designated parameter or configuration, plus or minus 10%. However, it should be understood that terminology used for orientation or relative position, such as front, rear, side, left and right, upper and lower, and the like, may be used in the Detailed Description for ease of understanding and reference, and may not be used as exclusive terms for the structures being described and illustrated.

Figure 5:
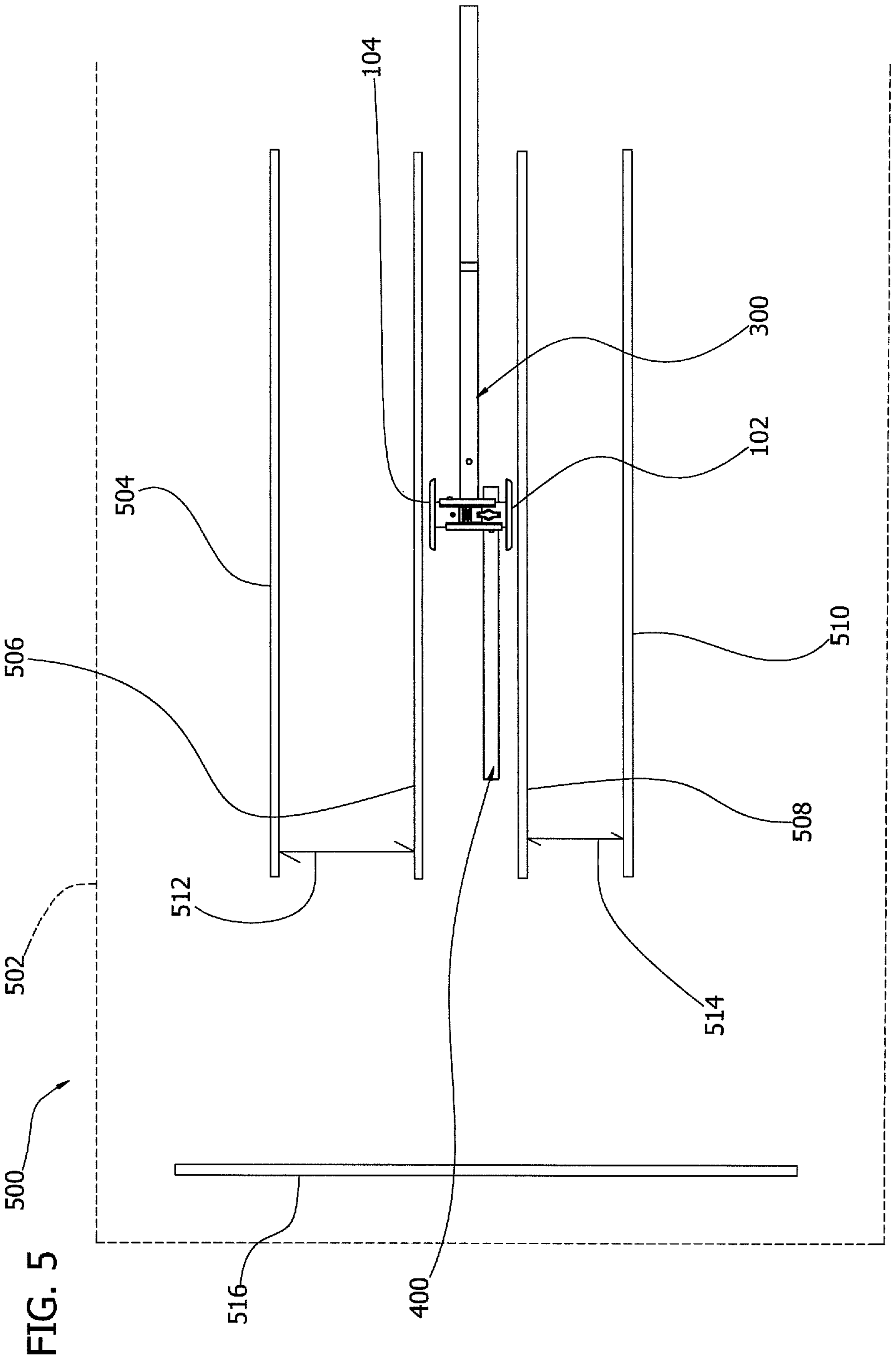
FIG. 5 is a schematic and side elevation of a piece of equipment that can be cleaned with the cleaning assembly of FIG. 1.

Examples of biplane cleaning tools are described herein, which may take a number of configurations. Biplane cleaning tools such as 100 may incorporate one or more spacer elements or assemblies 200 (FIGS. 1-3), and may be used to clean shelves in lyophilizers 500 (FIG. 5), described more fully below, which may have varied spaced shelves as to which it may be useful to allow the cleaning tool to be adjustable. In one example, the biplane cleaning tool 100 (FIGS. 1-3) includes first and second planar members 102 and 104, having respective first and second oppositely-facing surfaces 106 and 108 (see for example FIGS. 2-3) on to which respective cleaning components or cleaning fabrics may be placed for cleaning respective surfaces of the target equipment, such as shelves of a lyophilizer. In the present example, the first and second planar members are rectangular with respective beveled edges, and are approximately the same size. However, it is understood that other geometries and different sizes can be incorporated into a cleaning tool. As illustrated, the outwardly facing surfaces of the first and second planar elements are substantially flat and smooth, but the surfaces may be otherwise.

The cleaning tool includes a control adapter 110 supported by at least one of the first and second planar elements, and in the present example supported by the first planar element 102 on the interior surface 112 thereof. In the illustrated example, the control adapter 110 is an adapter block having a handle adapter 300 mounted on the block. In one example (not shown), the handle adapter 300 can be supported on the adapter block to allow pivoting of the handle adapter 300, and any handle attached to or supported by the handle adapter 300, for example either in a horizontal plane parallel to the planar elements 102 and 104 and/or in a vertical plane parallel to the handle adapter and transverse to the planar elements. The handle adapter 300 is provided for mounting a handle on the adapter so the user can operate the cleaning tool as desired. Other control configurations can be used alternatively or additionally.

The control adapter 110 in the present example also supports a stop element or limit element 400. The limit element 400 extends forward of the cleaning tool in a direction opposite the handle adapter 300. While the limit element 400 can extend forward of the cleaning tool a fixed distance, the present configuration allows the limit element to be adjusted in length by changing the relative position of the limit element in the adapter block. A wing bolt 114 extends into the adapter block from a side surface, and selectively or releasably fixes the position of the limit element 400 in the adapter block. The bolt in the adapter block establishes a relative position forward of the cleaning tool, for example that can limit the forward motion of the cleaning tool. Other fastener or securement elements may be used to selectively or releasably secure the limit element 400 in the adapter block.

The cleaning tool 100 includes one or more spacer elements 200, and in the illustrated example two spacer elements 202 and 204. The spacer elements can be different from each other, but in the present example are identical and mirror images, and only one spacer element or assembly 200 will be described in detail, namely spacer element or assembly 202. As illustrated, each spacer element is an assembly of components or structures, and, in the present example, is positioned closer to the lateral side edge of the planar elements than to the longitudinal center of the planar elements.

The spacer element 202 extends between the first and second planar elements 102 and 104, respectively. The spacer element 202 is adjustable to allow selective changing of the spacing between the planar elements. In one example of the spacer element 202, the spacer element includes a first structure 206 having a first structure surface 208 (FIG. 3), and a second structure 210 having a second structure surface 212 (FIGS. 2-3), and in the present example, the first structure surface 208 faces the second structure surface 212 at a given point where the two surfaces overlap. The first and second structures are controllably movable relative to each other, for example by a controllable locking element, securement, fastener, or similar structure, described more fully below.

Figure 1:
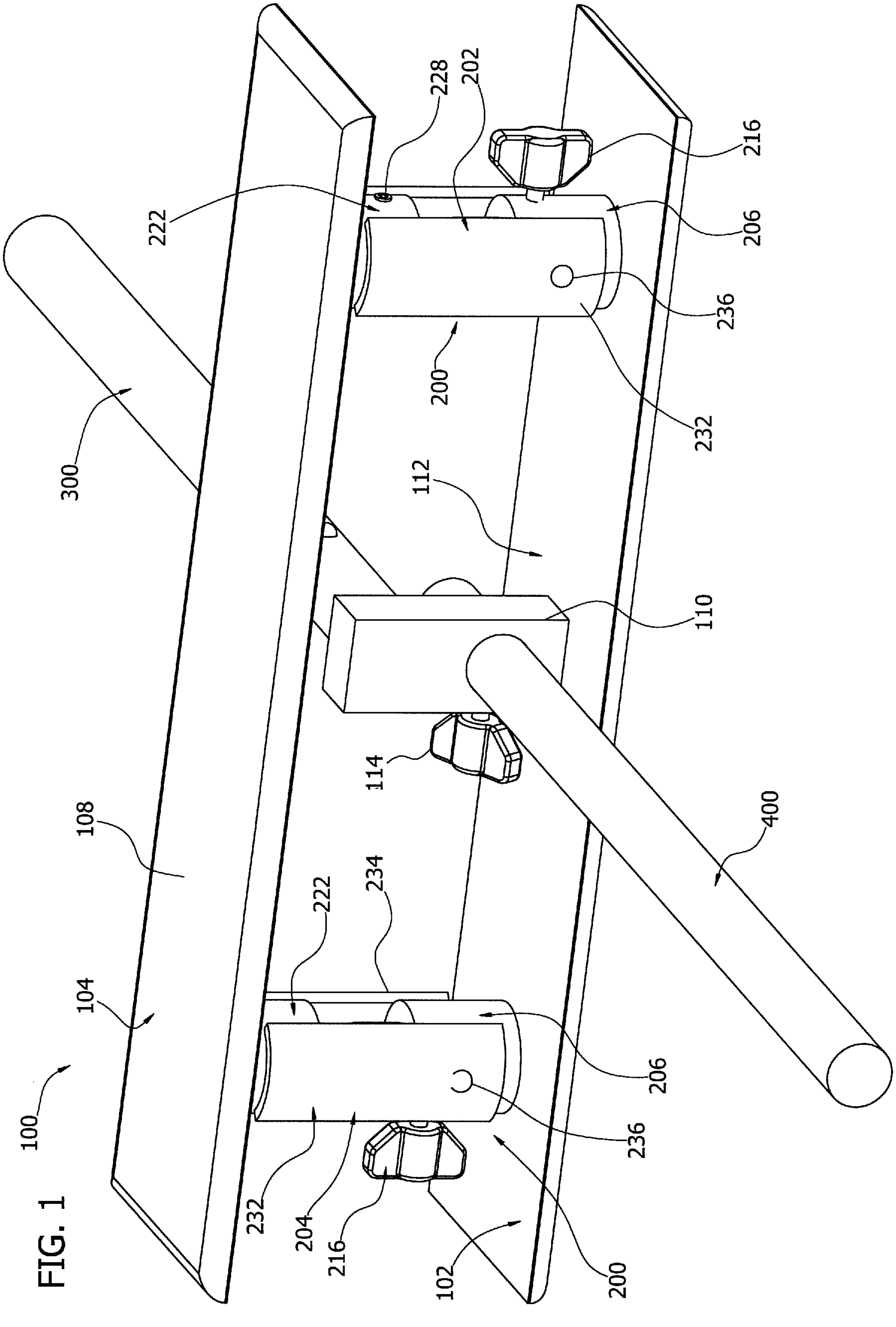
FIG. 1 is a schematic and an upper front left dimetric view of a bi-plane cleaning assembly configured to be adjustable.
Figure 2:
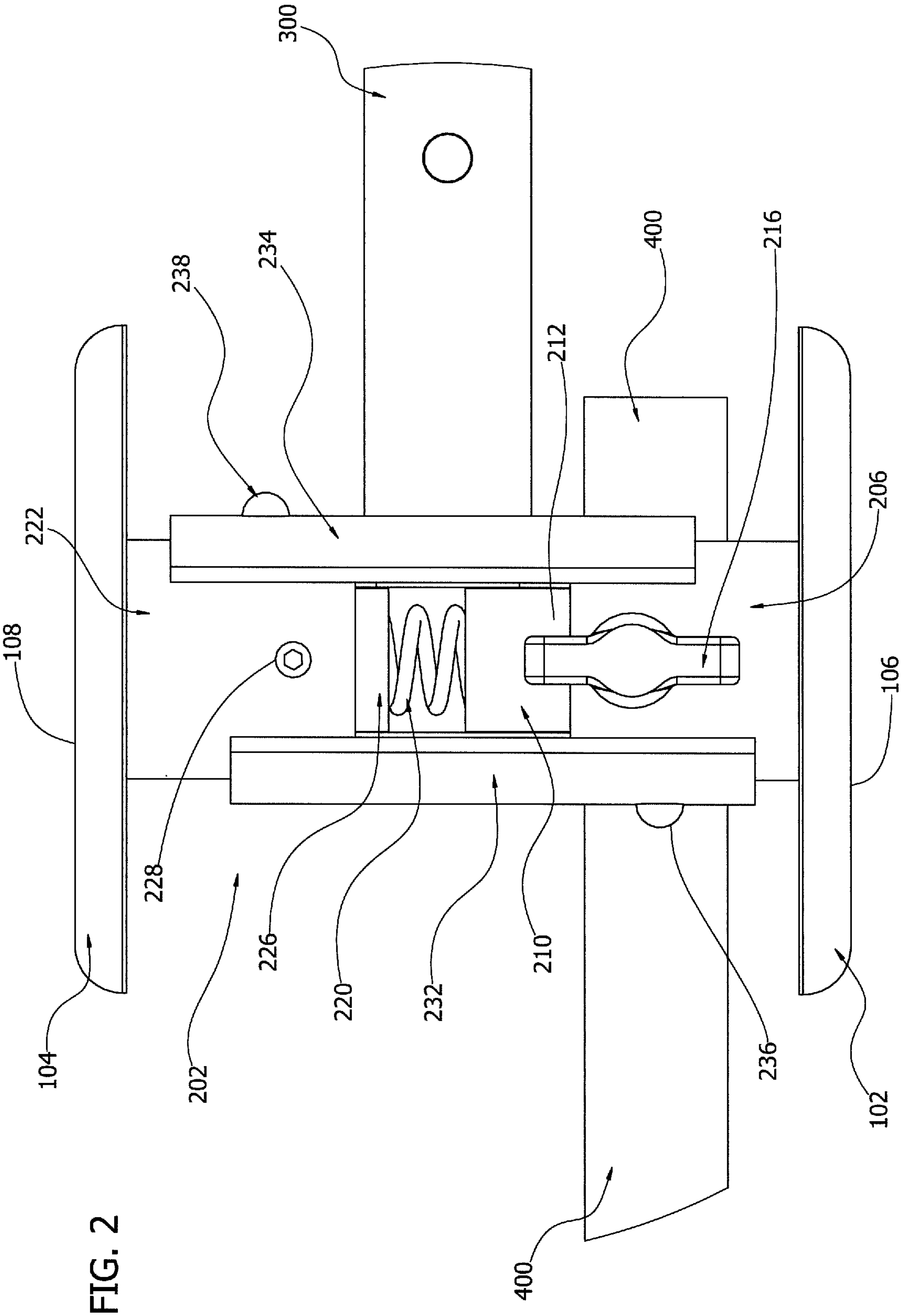
FIG. 2 is a schematic and a side elevation and detail view of the assembly of FIG. 1.
Figure 3:
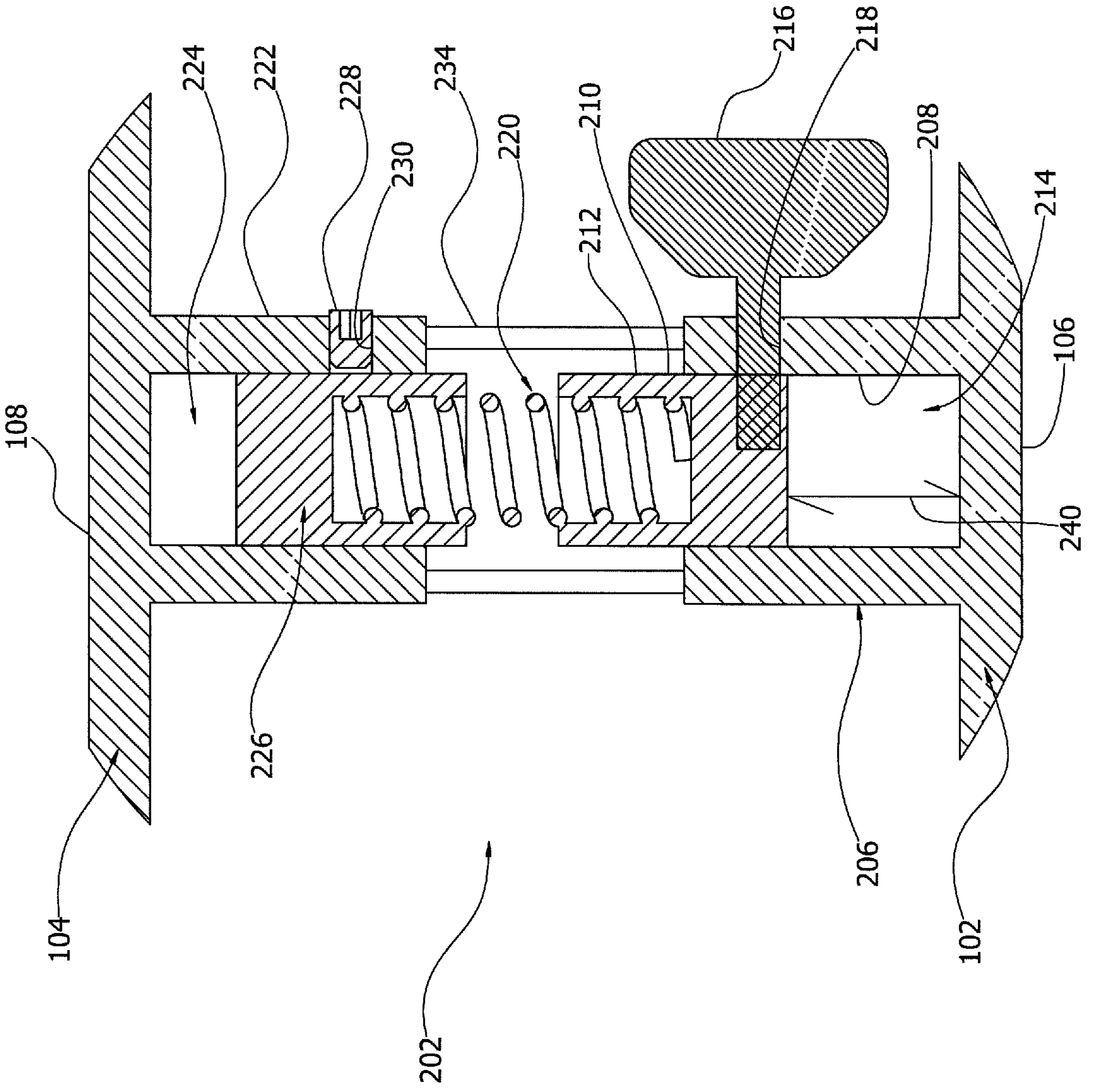
FIG. 3 is a schematic and a detail of a vertical transverse cross-section of the assembly of FIG. 1.

In the configuration illustrated in FIGS. 1-3, the first structure 206 is a first cylindrical body supported by the first planar element 102. The first cylindrical body is illustrated as being a right circular cylinder, but it may take other geometries, including other cylindrical geometries such as rectangular, polygonal, and the like. In the present example and as illustrated, the first cylindrical body contacts the first planar element 102, and as illustrated is integral or monolithic there with. Alternatively, the first cylindrical body 206 can be mounted on, secured to or otherwise fixed to the interior surface of the first planar element 102 to be integral therewith. The first cylindrical body 206 includes a hollow portion, in the present example bore 214, defining an internal surface, part of which includes the facing surface 208. The facing surface 208 will be that part of the surface of the bore enclosing the adjacent surface 212 of the second structure 210. The second structure 210 can be selectively positioned in the bore 214 and secured in the selected position so as to select the desired spacing between the planar elements 102 and 104. The second structure 210 can be secured in position to select the desired spacing for the planar elements.

As illustrated, the first structure 206 forms an annular boss mounted on the interior surface of the first planar element. The annular boss includes an outer cylindrical wall and an inner cylindrical wall, the inner cylindrical wall defining a hollowed out portion, in the present example bore 214, for receiving a portion of the second structure 210.

In the configuration illustrated in FIGS. 1-3, the second structure 210 is a second cylindrical body supported by the first planar element 102. The second cylindrical body is illustrated as being a right circular cylinder, but it may take other geometries, including other cylindrical geometries such as rectangular, polygonal, and the like, and where the second cylindrical body is positioned interior to the first cylindrical body, the outer geometry of the second cylindrical body may conform to the interior geometry of the first cylindrical body. In an example where the second cylindrical body is positioned on the outside of the first cylindrical body, the outer geometry of the first cylindrical body will conform to an interior geometry of the second cylindrical body. In the illustrated example, the outer cylindrical surface of the second cylindrical body includes a portion that forms the facing second cylindrical body surface 212 facing the adjacent surface on the first cylindrical body.

As illustrated, the second structure 210 forms a boss supported on the first planar element by being supported on the boss formed by the first structure 206. The outer surface of the second boss in the present example is a geometry that conforms at least in part to the inside geometry of the first boss 206 so that the second boss can slide within the first boss for adjusting the spacing between the first and second planar elements. While the first and second structures can alone define the spacing between the first and second planar elements, the spacer element 202 includes additional components, for example a spring or other bias, for defining the spacing between the planar elements, as described more fully below.

In the illustrated configuration, the first and second structures, cylinders, or bosses 206 and 210 are nested with respect to each other, with the second structure 210 nested inside the first structure 206. In an alternative configuration, the first structure can nest inside the second structure. Where the first and second structures have similar geometries, the first and second structures may be configured as being concentric, but even dissimilar geometries may be calculated to be concentric. With the first and second structures, cylinders, or bosses movable relative to each other with at least part of one inside at least part of the other, they are telescoped together.

The spacer element also includes a controllable locking element 216 supported by the outer one of the first and second structures, first and second cylinders, or first and second bosses, and configured to selectively or releasably lock the first and second components relative to each other. The controllable locking element allows selective adjustment of the spacing between the first and second planar elements. In the illustrated configuration, the controllable locking element 216 is a wing bolt having a threaded shank portion threadedly engaging a threaded opening 218 in a sidewall of the first structure 206. Alternatively, where the second structure, cylinder or boss is external to the boss, the locking element 216 would be supported in a threaded opening in the second structure, cylinder or boss. In the illustrated configuration, the end of the shank of the wing bolt contacts and bears against the facing surface of the second structure, cylinder or boss (does not extend into the interior), to secure the first and second components relative to each other. To change the spacing of the first and second planar elements, the wing bolt 216 is unthreaded sufficiently to allow the second structure, cylinder or boss to slide to a new position as desired, at which position the wing bolt 216 is threaded in to secure the position of the second structure, cylinder or boss relative to the first. In other configurations, the controllable locking element 216 can be another fastener configuration, latch, gear element or other securement.

The locking element 216 is positioned longitudinally on the spacer element to optimize the range of spacing adjustment available to the user. In the assembly illustrated in FIG. 1, the locking element 216 is positioned on a lateral side of the spacer element so as to avoid interfering with a brace structure, described more fully below. Graduations or markings (not shown) can be included on the outer surface 212 of the second structure 210 to indicate settings for predetermined spacings of the first and second planar elements.

The spacer element in the illustrated configuration includes a spring or other bias element 220. The spring 220 extends between the second structure 210 and a structure on the second planar element 104. In the present example, the coil spring or compression spring is biasing the first and second planar elements apart, or is biasing the spacer element to a greater length. In the present example, the spacer element includes an opposite structure 222 supported on an interior surface of the second planar element 104, and extending toward the first planar element. The opposite structure 222 is illustrated as a cylindrical element, in the present example a right circular cylindrical element, or an annular boss, having a cylindrical bore 224 (FIG. 3), which alternatively may be a cavity, or hollowed out portion. The spacer element 202 further includes a spring housing 226. The spring housing is nested in or concentric with the bore 224 and is releasably or selectively secured in place by a set screw 228 threaded into a threaded bore 230 in a sidewall of the structure 222. For a given configuration and spacing of the spacer element 202, the set screw 228 can be used to selectively change the spacing of the spacer element 202. In another configuration, the spring housing 226 can be omitted and the spring 220 can extend into and seat in the bore 224. The length of the spring can be selected accordingly to provide the desired spring force for a given spacing element configuration. The spring 220 can be held in place in the second structure 210 and/or housing 226 by one or more split spring pins (not shown), for example a single split spring pin in one or the other of the second structure 210 and housing 226, or one split spring pin in each to retain the spring.

The spacer element can also include a forward support brace or support plate 232 on a forward facing side of the spacer element, and another rearward support brace or support plate 234 on a rearward facing side of the spacer element. The support braces or support plates help to maintain vertical alignment of the first and second planar elements during use of the cleaning tool. The forward support brace 232 is securely mounted to the first structure 206 by a fastener 236, and conforms to the outer surface of the structure 206. The forward support brace 232 extends toward the second planar element and adjacent the opposite structure 222 supported on the second planar element 104. Similarly, the rearward support brace 234 is securely mounted to the opposite structure 222 by a fastener 238, and conforms to the outer surface of the opposite structure 222. The rearward support brace extends toward the first planar element and adjacent the first structure 206, and conforms to the outer surface of the first structure.

Figure 4:
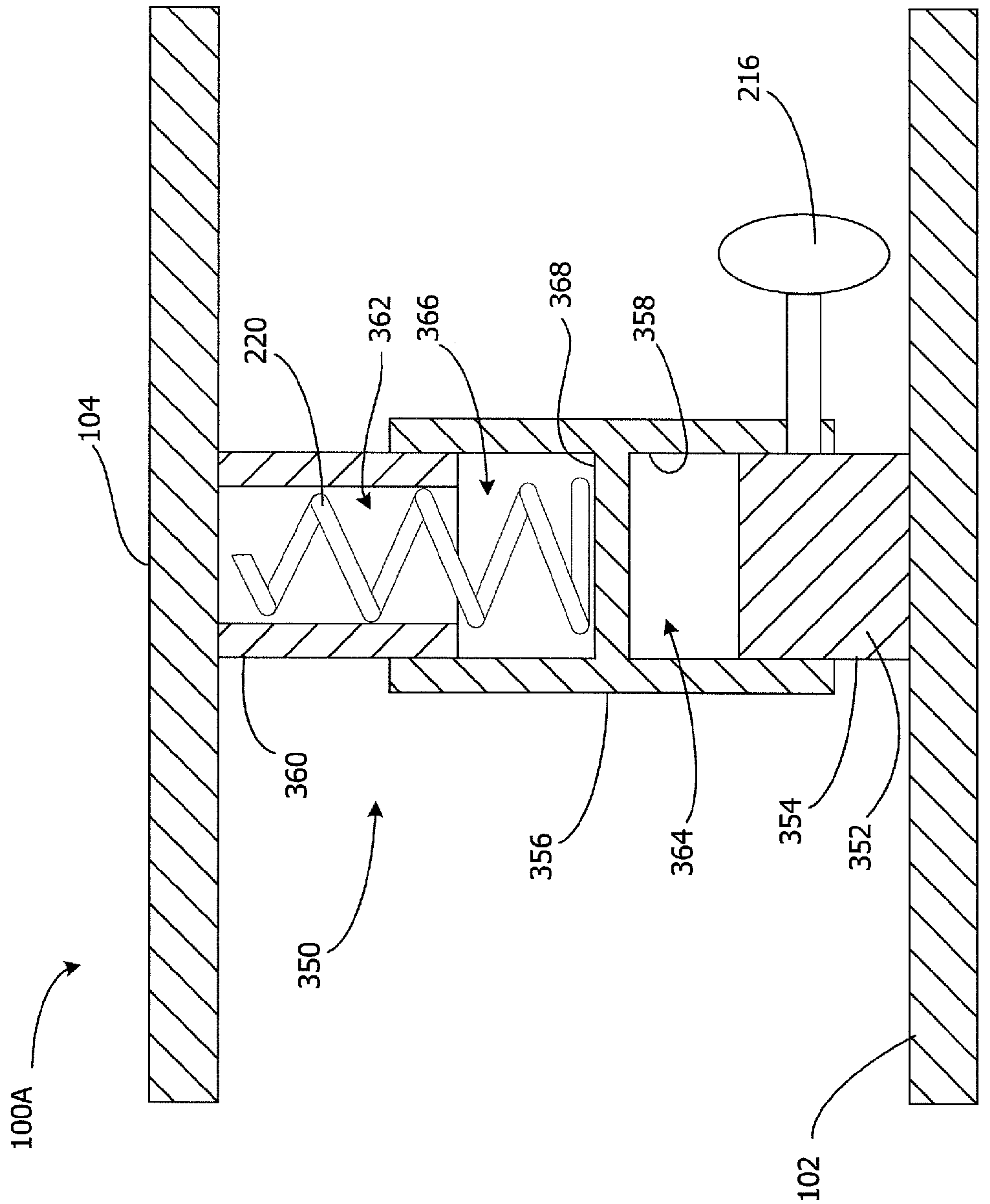
FIG. 4 is a schematic and a detail of a vertical transverse cross-section of an alternative spacer element for use in the assembly of FIG. 1

In an alternative spacer element, for example one such as that illustrated in FIG. 4, a cleaning tool 100A can be identical to the cleaning tool 100 described herein, and identical or similar components will be numbered the same and have the same or similar structures and functions. In the present example, the cleaning tool can have multiple spacer elements that are identical, or have at least one spacer element 350 extending between the first and second planar elements 102 and 104. The spacer element is adjustable to allow selective changing of the spacing between the planar elements. In the present example, the spacer element 350 includes a first structure 352 having a first structure surface 354 and a second structure 356 having a second structure surface 358. In the illustrated example, the first structure surface faces the second structure surface at a given point where the two surfaces overlap. The first and second structures are controllably movable relative to each other, for example by a controllable locking element, securement, fastener, or similar structure, such as the wing bolt 216.

In this example, the first structure 352 is a first cylindrical body supported by the first planar element 102 and is a right circular cylinder, but may take other geometries, including other cylindrical geometries such as rectangular, polygonal, and the like. The first cylindrical body contacts the first planar element and can be integral or monolithic there with, or it can be supported by the first planar element 102 through another structure. It can be mounted on, secured to or otherwise fixed relative to the interior surface of the first planar element.

As illustrated, the first structure 352 forms an annular boss mounted on the interior surface of the first planar element. The annular boss includes an outer cylindrical wall for receiving and supporting a portion of the second structure.

The second structure 356 is a second cylindrical body supported by the first planar element through the first structure 352, and in the present example is a right circular cylinder, but it may take other geometries, including other cylindrical geometries such as rectangular, polygonal, and the like selected to permit reliable support of the second structure by the first structure. In the illustrated configuration, the second surface 358 conforms to the first surface 354 of the first structure, and the second surface 358 is a right circular cylindrical surface conforming to the first surface 354 and can slide over the first surface when the wing bolt is loosened sufficiently to allow such movement. The interior cylindrical surface 358 includes a portion that forms the facing second cylindrical body surface facing the adjacent surface on the first cylindrical body 352.

As illustrated, the second structure 356 forms a boss supported on the first planar element by being supported on the boss formed by the first structure 352. The inner surface of the second boss is a geometry that conforms at least in part to the outside geometry of the first boss 352 so that the second boss can slide over the first boss for adjusting the spacing between the first and second planar elements. The first and second structures can alone define the spacing between the first and second planar elements, but in the present example the spacer element 350 includes additional components for defining the spacing between the planar elements.

In the present configuration, the first and second structures, cylinders or bosses 352 and 356 are nested with respect to each other, with the first structure 352 nested inside the second structure 356. The first and second structures are concentric and telescope with respect to each other.

The spacer element 350 also includes the controllable locking element 216 supported by the second structure 356. The locking element 216 selectively or releasably locks the first and second structures 352 and 356, respectively, relative to each other, allowing selective adjustment of the spacing between the first and second planar elements. The locking element 216 engages a threaded opening (not shown) in the second structure 356, and the end of the shank bears against the facing surface of the first structure 352. The locking element is positioned on a lateral side of the spacer element for easy accessibility, while it can alternatively be positioned on a forward or rearward side of the spacer element. To change the spacing of the first and second planar elements, the wing bolt 216 is unthreaded sufficiently to allow the second structure 356 to move or slide to a new position as desired, at which position the wing bolt 216 is threaded in to secure the position of the second structure relative to the first structure. Other controllable locking elements can be used instead or additionally.

The illustrated spacer element 350 includes the spring 220 or another bias element. The spring 220 extends between the second structure 356 and a structure on the second planar element 104. In the present example, the coil spring or compression spring is biasing the first and second planar elements apart, or is biasing the spacer element to a greater length. In the present example, the spacer element includes a third structure in the form of a cylindrical element 360 supported on an interior surface of the second planar element 104, and extending toward the first planar element. The cylindrical element 360 in the present example is a right circular cylinder having a bore 362, or it may be a cavity or hollowed out portion for receiving a portion of the spring 220. The length of the spring can be selected accordingly to provide the desired spring force for a given spacing element configuration. The spring can be held in place by one or more split spring pins (not shown), such as in the example of the example described previously.

The spacer element can include forward and rearward support braces or support plates, such as supports 232 and 234 described with respect to FIG. 2, if desired. Support braces can be mounted on respective ones of the planar elements or on spacers supported by the first and third structures, 352 and 360, respectively, configured in such a way as to provide support for helping to maintain the first and second planar elements substantially parallel to each other.

In the configuration of the cleaning tool 100A illustrated in FIG. 4, the first structure 352 is a boss, which may be solid or partially hollow, secured to the interior surface of the planar element 102. The boss is substantially right circular cylindrical and has a smooth outer surface 354, suitable for allowing the second structure 356 to slide as desired over the outer surface 354 of the boss. The outer surface 354 of the boss may include indentations, cups, cavities or divots formed axially of the boss to receive a complementary geometry on the end surface of the shank of the wing bolt 216, to more reliably fix the second structure 256 on the boss when the wing bolt is tightened down. In one configuration, the indentations can be hemispherical, and the tip of the shank on the wing bolt also hemispherical or more pointed to help fix the two structures together. Graduations or markings (not shown) can be included on the outer surface 354 of the boss 352 to indicate settings for predetermined spacings of the first and second planar elements.

In the example of the cleaning tool 100A, the second structure 356 is a sleeve that fits over the boss 352 and the third structure 360. The sleeve includes a bore 364 into which the boss 352 extends, and a bore 366 into which extends the structure 360 and the spring 220. In one example, the bores 364 and 366 can be the same bore, with the spring 220 extending from an area adjacent the interior surface of the second planar element 104 to a top surface of the boss 352. In another example, and as illustrated in FIG. 4, the sleeve 356 is a bifurcated sleeve with an interior wall 368 separating the first and second bores 364 and 366 into separate chambers. In the illustrated example, the spring 220 extends to the interior wall 368.

The cleaning tool can be used to clean oppositely facing surfaces, for example adjacent shelves in a lyophilizer. A lyophilizer is shown schematically in FIG. 5 as 500, having an enclosure 502 with a plurality of shelves 504, 506, 508 and 510, where the spacing between shelves 504 and 506 is different than the spacing between other adjacent shelves. For example, the spacing 512 between the shelves 504 and 506 is greater than the spacing 514 between the shelves 508 and 510. The cleaning tool is configured so that the spacing between the first and second planar elements 102 and 104, with cleaning pads in place, is less than or equal to the spacing between the shelves 506 and 508, and the limit element 400 is adjusted so that it will contact an end wall 516 of the lyophilizer before the first and second planar elements pass the ends of the shelves 506 and 508. The cleaning tool is then adjusted to the desired spacing between the first and second structures, cylinders or bosses, which translates to a desired spacing 240 in the bore 214 (FIG. 3), so that the planar elements have the desired spacing. The wing bolts 216 are then secured to fix the nested structures in place, while the springs continue to bias the planar elements apart. All shelf surfaces spaced apart by the distance 514 can then be cleaned as desired. To clean the shelf surfaces of the shelves 504 and 506, the tool is adjusted as desired and placed between them, and the shelves cleaned as desired.

Having thus described several exemplary implementations, it will be apparent that various alterations and modifications can be made without departing from the concepts discussed herein. Such alterations and modifications, though not expressly described above, are nonetheless intended and implied to be within the spirit and scope of the inventions. Accordingly, the foregoing description is intended to be illustrative only.

What is claimed is:

1. A bi-plane cleaning tool comprising:

first and second planar members having respective first and second oppositely- facing surfaces for receiving respective cleaning components so as to extend over planar portions of the planar members to be configured for cleaning a planar surface;

a control adapter supported on the first planar member for receiving a control element;

at least one spacer element extending between the first and second planar members wherein the at least one spacer element includes a first structure having a first structure surface and a second structure having a second structure surface wherein the first and second structure surfaces face each other and are controllably movable relative to each other such that a length of the at least one spacer element increases or decreases with such movement; and a controllable locking element supported on one of the first and second structures and contacting the surface of the other of the first and second structures for releasably locking the positions of the first and second structures relative to each other.

2. The tool of claim 1 wherein the first and second oppositely-facing surfaces are substantially planar.

3. The tool of claim 1 wherein the control adapter is configured to releasably receive a handle element.

4. The tool of claim 1 further including a third structure supported by the second planar member.

5. The tool of claim 1 further including a second. spacer element extending between the first and second planar members.

6. The tool of claim 1 further including a stop element extending in a direction away from the control adapter.

7. The tool of claim 6 wherein the stop element extends away from the control adapter a distance that is adjustable.

8. The tool of claim 1 wherein the at least one spacer element first structure is a cylindrical element having a first cylindrical surface and wherein the second structure surface extends along the first cylindrical surface.

9. The tool of claim 8 wherein the cylindrical element is circular.

10. The tool of claim 8 wherein the cylindrical element includes a hollow portion including the first cylindrical surface and wherein the second structure surface extends along the first cylindrical surface within the hollow portion.

11. The tool of claim 8 wherein the cylindrical element has an outer surface including the first cylindrical surface and wherein the second structure surface extends along the first cylindrical surface on the outer surface of the cylindrical element.

12. The tool of claim 1 wherein the first and second structures are telescoped, concentric cylinders or nested columns.

13. The tool of claim 12 wherein the first structure is supported by the first planar member and the controllable locking element is supported on the first structure.

14. The tool of claim 13 wherein the first structure includes a hollow portion and the second structure extends into the hollow portion a distance and wherein the distance is controlled by the controllable locking element.

15. The tool of claim 14 wherein the second structure includes a hollow portion for receiving a biasing element.

16. The tool of claim 12 wherein the first structure is supported by the first planar member and the controllable locking element is supported on the second structure.

17. The tool of claim 16 wherein the second structure includes a first hollow portion and the first structure extends into the first hollow portion a distance and wherein the distance is controlled by the controllable locking element.

18. The tool of claim 17 wherein the second structure includes a second hollow portion for receiving a biasing element.

* * * * *